United States Patent Office 3,433,757
Patented Mar. 18, 1969

3,433,757
NON-PAINTED, COLORED, HARD RUBBER STEERING WHEEL
Alex T. Sturrock, Lathrup Village, Mich., assignor, by mesne assignments, to Sheller-Globe Corporation, a corporation of Ohio
No Drawing. Filed Aug. 29, 1966, Ser. No. 575,538
U.S. Cl. 260—31.4
Int. Cl. C08d 9/00, 11/76; B62d 1/04
4 Claims

ABSTRACT OF THE DISCLOSURE

A colored hard rubber steering wheel for steering vehicles and the like which wheel is of generally uniform color throughout its hard rubber composition, said wheel being comprised of means for grasping by hand and capable upon rotation of steering the vehicle, with the hard rubber composition comprising in parts by weight: 100 parts of styrene-butadiene rubber copolymer, about 60 to about 90 parts of a high viscosity hydrated silica pigment for thickening and having a particle size of less than 325 mesh, from 60 to about 200 parts of a low viscosity hydrated silica pigment for thinning and having an ultimate particle size of about 0.08 to about 0.12 micron, about 5 to about 60 parts of a processing aid, about 2 to about 30 parts organic polyhydroxy plasticizer, about 1 to about 18 parts peroxide vulcanizing agent, and about 0.05 to about 7 parts coloring agent, and, the method of preparing same.

---

This invention relates to a colored hard rubber steering wheel and to a method of preparing the wheel.

In the past, typical hard rubber steering wheels have been painted after the hard rubber has been vulcanized and the wheel formed. The paint was baked on to give a hard wear-resistant finish with high gloss, and it has been demonstrated through experience with field tests and wheels in service, that the various types of paint used for this purpose show relatively high wear. Although the wear resistance of such paint has been greatly improved by selection of paints with improved wear resistance, all the problems have still not been overcome and wheels made as above described when put into actual service show excessive wear in a relatively short time. Some of these wheels may show wear at lower mileage than others, and some new wheels become disfigured due to paint chipping, gouging with hard objects, etc. In such cases the black hard rubber base of the wheel shows through and it is unsightly and objectionable. Also, in severe cases of wear the black rubber base stock is exposed and frequently rubs off on the driver's hands, gloves or shirt front. This again is very objectionable. Attempts to produce a hard rubber steering wheel which has a uniform color throughout the hard rubber have been made in the past, however, the attempts have not been successful because in order to get a hard rubber composition which will pass steering wheel specifications, high sulfur loadings are required. Yet a high sulfur loading in the rubber formulation is incompatible with uniform coloring throughout the rubber due to the fact that the high sulfur causes discoloration, and hence makes the attainment of a uniform coloring throughout the rubber impractical if not impossible. Preparation of hard rubber formulations suitable for use as steering wheels has also been attempted by using a resinous material as a filler in the rubber formulation. However, such a rubber formulation containing a resinous material is not suitable for use as a hard rubber steering wheel for the reason that such formulations will not pass the necessary hot and cold cracking tests, impact tests, etc., which are specified for steering wheels to be used in automotive vehicles and the like.

Accordingly an object of this invention is to provide an improved steering wheel made of hard rubber which has a uniform color throughout the composition of said rubber.

Another object of the invention is to provide a method of preparing a uniformly colored hard rubber steering wheel which does not require an exterior coating of paint.

Another object of the present invention is to provide an improved colored hard rubber steering wheel which due to the fact that it requires no exterior coat of paint, thereby saves on paint costs.

Another object of the present invention is to provide an improved hard rubber steering wheel which, because of the fact that it has a uniform color throughout the hard rubber, wears much better than a conventional hard rubber steering wheel which has an exterior paint coating which is subject to wearing out and exposing the underlying hard rubber.

Another object of the invention is to provide an improved non-painted, colored, hard rubber steering wheel which does not show as much wear as a conventional painted hard rubber wheel.

Another object of the present invention is to provide an improved colored hard rubber steering wheel which gives long wear and service life.

Another object of the present invention is to provide a non-painted, colored, hard rubber steering wheel with a clear protective finish coating thereon.

Another object of the present invention is to provide an improved colored, hard rubber steering wheel which is economical and practical to manufacture.

Another object of the invention is to provide an improved steering wheel which has excellent wear resistance especially as related to the chipping and gouging of the surface.

Another object of the invention is to provide an improved hard rubber steering wheel which is of uniform color throughout its composition and which steering wheel lends itself to color variations which include bright colors as well as black or metallic colors, and which steering wheel also is endowed with a molded surface allowing high gloss retention.

Another object of the invention is to provide an improved hard rubber steering wheel which is of relatively low cost and which is therefore competitive with painted hard rubber steering wheels, polypropylene steering wheels, or other plastic steering wheels.

Still another object of the invention is to provide a method of preparing said non-painted, colored, hard rubber steering wheel.

Other objects, features and advantages of the present invention will come apparent from the subsequent description and the appended claims.

In its product aspect broadly stated, the present invention comprises a non-painted, colored, hard rubber steering wheel which is of the same or uniform color all the way through its cross section or composition. It has been found that a steering wheel of this type in accordance with the invention performs very well under actual usage conditions, that the wheel exhibits little wear, and it actually becomes more polished during usage. Although the preferred adaptation of the product in accordance with this invention is for use as a steering wheel of the circular type, or also of the wrist-twist variety which are of more recent development, other uses for products in accordance with the invention would be to utilize the colored hard rubber to form, for example by molding or the like, products such as automotive knobs, and handles, accelerator pedals, kitchen furniture where plastic arms and legs, etc. are required, car mats with more scuff resistance, caster wheels on appliances, and handles on appliances, such as TV knobs, etc.

In its method aspect, broadly stated, the present invention comprises preparation of a non-painted, colored, hard rubber steering wheel by either transfer molding, compression molding, injection molding, or the like, using a starting composition described hereinbelow.

The composition broadly stated, from which the hard rubber steering wheels in accordance with this invention is prepared can be described in approximate figures as follows in Table 1.

TABLE 1

| Material: | Parts by wt. |
|---|---|
| 1. Styrene-butadiene copolymer | 100 |
| 2. Pigments: | |
| (a) high viscosity pigmenting agent for thickening | 60–150 |
| (b) low viscosity pigmenting agent for thinning | 0–250 |
| 3. Processing aid | 5–60 |
| 4. Mineral oil | 0–30 |
| 5. Plasticizer | 2–30 |
| 6. Vulcanizing agent | 1–18 |
| 7. Coloring agent | 0.05–10 |

The preferred ranges for the materials of the composition in accordance with the invention are sett out below in approximate figures in Table 2; and the best composition range for use in the invention is set out in Table 3 below in approximate figures.

TABLE 2

| Material: | Parts by wt. |
|---|---|
| 1. Styrene-butadiene copolymer | 100 |
| 2. Pigments: | |
| (a) hydrated silica thickening or high viscosity agent | 60–90 |
| (b) hydrated silica thinning or low viscosity agent | 60–200 |
| 3. Processing aid | 5–60 |
| 4. Mineral oil | 0–30 |
| 5. Plasticizer | 2–30 |
| 6. Vulcanizing agent | 1–18 |
| 7. Coloring agent | 0.05–7 |

TABLE 3

| Material: | Parts by wt. |
|---|---|
| 1. Styrene-butadiene copolymer | 100 |
| 2. Pigments: | |
| (a) hydrated silica thickening or high viscosity agent | 60–90 |
| (b) hydrated silica thinning or low viscosity agent | 60–200 |
| 3. Processing aid | 10–30 |
| 4. Mineral oil | 0–30 |
| 5. Plasticizer | 6–10 |
| 6. Vulcanizing agent | 2–12 |
| 7. Coloring agent | 0.1–7 |

The parts by weight of each material referred to in the above tables are based on 100 parts of the styrene-butadiene copolymer.

The styrene-butadiene copolymer used in the composition should be a block copolymer of styrene and butadiene and should possess extremely good low temperature properties such as flexibility, no shrinkage, and good processing characteristics at temperatures of about −80° F. The polymerized styrene-butadiene copolymer should preferably be comprised of about 75+ or −1% butadiene, and 25+ or −1% styrene of which about 18+ or −2% is polymerized styrene, all in percents by weight. As a rubber compound the styrene-butadiene copolymer in accordance with the invention, should exhibit excellent resistance to stiffening at low temperature as above referred to and also it should exhibit excellent resistance to abrasion, have a high durometer hardness, and low nerve for good extrusion and calendering characteristics. A preferred styrene-butadiene block copolymer which meets the above requirements and which has been found satisfactory for use in the composition, is Solprene-1205 available from the Phillips Chemical Company. Small amounts of other rubber materials may be present in the composition in conjunction with the SBR copolymer, such as for example, polyisoprene or the like.

The pigments used in the composition should be of the type termed "hydrated silica pigments." Both a high viscosity and a low viscosity type hydrated silica pigment may be used and, broadly, the total amount of hydrated silica pigment present in the composition can be within the range of about 60 to about 400 parts by weight, which latter figure is the combined amount for both the high and low viscosity pigments when the two are used in conjunction. When a transparent or translucent colored rubber steering wheel is desired, it can be obtained using only the high viscosity silica pigment in the composition. This is possible because the low viscosity pigment which give excellent hiding power to the composition is not needed since hiding power is not necessary for a translucent or transparent colored hard rubber steering wheel. However, when the type of wheel desired is not to be either transparent or translucent, it is then necessary that both the high viscosity hydrated silica pigment and the low viscosity hydrated silica pigment both be present and this is the preferred form of the invention.

The high viscosity hydrated silica pigment should be of the precipitated type and in powder form with a fineness or particle size of less than about 325 mesh and a specific gravity of about 2. The high viscosity pigment should provide high reinforcement to the composition and particularly it should provide high tear strength to the colored rubber steering wheel, act as a reinforcing and thickening agent and be easily dispersible; while imparting high stiffness and resistance to deformation of the uncured stock composition Hi-Sil 233 is a typical material which can be satisfactorily used as the high viscosity hydrated silica pigment, and Hi-Sil 233 has an average or ultimate particle size of approximately 0.022 micron; and also an overall powder fineness of less than 325 mesh as is specified in (1) publication "Rubber Age," June 1955, page 399, or (2) publication "Rubber World Materials and Compounding Ingredients for Rubber and Plastics," 1965, page 446.

The low viscosity hydrated silica pigment should also be of the precipitated type and preferably should be in powder form having a specific gravity of about 1.9 and an ultimate particle size of about 0.08 to about 0.12 micron. The low viscosity pigment need not function to give exceptionally high reinforcement to the rubber composition but it should provide the cured composition with exceptionally low permanent and compression set, as well as with properties of excellent processing, smooth extruding and calendering, dimensional stability, and it also should be easily dispersible in the composition.

The processing aid used in the composition should be one which improves the hardness and tear resistance in the cured composition, and it should also be one which is non-staining when used in a colored rubber stock. It should preferably be a solid at room temperature with a melting point of approximately 100° C., a specific gravity of about 1, and an acid number of less than about 1. A typical example of such a processing aid suitable for use in the invention would be a substituted styrene copolymer such as Piccotex No. 100 resin available from the Pennsylvania Industrial Chemical Corporation. The choice of the processing aid for use in the composition is not critical and any number of different processing aids could be used so long as it generally satisfies the above described requirements.

The plasticizer used in the composition should be such that when a silicate type pigment is added to the composition of the steering wheel in order to achieve proper scuff, abrasion resistance, etc., the rubber compound in an unvulcanized state should not become overly stiff, of too high viscosity, or of such a nature as to allow excessive heat build up to take place during processing. Therefore, the plasticizer used should be one which will plasticize the SBR rubber copolymer and at the same time lower the viscosity of the formulation. In addition, the plasticizer should not interfere with the peroxide curing system and, still further, the plasticizer should exhibit good compatibility and color stability with the other ingredients in the formulation. Plasticizers which have been found suitable for use in the composition and which fulfill the above requirements can be classified as organic polyhydroxy plasticizer compounds. Typical examples of plasticizers falling within this classification are: Benzoflex 9–88 (available from Velsicol Chemical Corporation) which is dipropylene glycol dibenzoate, pentanediol, 1,3-butanediol, or mixtures thereof. Of these the most suitable results have been obtained when 1,3-butanediol is used, and therefore this is the preferred plasticizer of the invention.

The vulcanizing or curing agent for use in the composition should be a peroxide-type curing agent such as Varox, Luperco 130–XL, Dicup 40–C, t-butyl perbenzoate, or the like.

Luperco 130–XL is a composition containing 43% by weight of 2,5-dimethyl -2,5-di(t-butylperoxy) hexane-3 on an inert filler. Luperco 130–XL has a form of free flowing, white powder and because of its outstanding thermal properties is ideally suited for high temperature curing of rubber formulations without scorching. Luperco 130–XL is available from Wallace and Tiernan, Incorporated.

Dicup 40–C is a composition comprised of approximately 40% dicumyl peroxide supported on a calcium carbonate precipitate. The composition is a free flowing white powder having a specific gravity of approximately 1.53 and a bulk density of approximately 4 pounds per gallon. It acts as a non-sulfur vulcanizing agent and is useful for providing the rubber stock with good heat resistance. Dicup 40–C is available from the Hercules Powder Company.

Varox is a peroxide vulcanizing or curing agent which has properties of water white to light yellow color, it is liquid at room temperature, with a specific gravity of about 0.87 + or −0.02. Varox is also furnished as a white colored powder of 50% strength having a specific gravity of about 1.35 + or −0.03 and a powder fineness or particle size of about 99.9% through a 100 mesh screen. Varox is available from the R.T. Vanderbilt Company, Inc.

The coloring agent for use in the composition should either be a high intensity carbon black which is suitable for coloring or in the alternative, the coloring agent may be an organic coloring material which is compatible with the styrene-butadiene copolymer used, and which organic coloring material when used is normally added to the composition in the form of a dispersion in a conventional SBR polymer. Still further, the coloring agent may be an inorganic coloring pigment in powder form. For a black colored steering wheel it is preferred to use a high intensity carbon black to provide the composition with a deep black color. For other colored steering wheels such as, for example, blue, green, yellow, or red, it is preferred to use an organic coloring material. Any number of materials can satisfactorily be used for the coloring agent and the choice thereof is not critical. Specific coloring materials suitable for use in the composition are set out in the examples which follow hereinbelow.

In the examples which set forth specific blue, green, yellow, and red steering wheels, the organic coloring material used was dispersed in an amount of 50% by weight of an SBR type rubber polymer having a trade designation of No. 1001 in accordance with the International Institute of Synthetic Rubber Producers, Inc. (August 1963 edition). The type 1001 SBR rubber has a target bound styrene percent of 23.5, a nominal Mooney viscosity (ML 1+4, at 212° F.) of 48. Type 1001 SBR rubber is available from either Firestone Rubber Company or Goodrich Gulf Co.

The method of preparing colored hard rubber steering wheels in accordance with the invention comprises the steps of first weighing and mixing the materials of the composition excepting the vulcanizing agent and the coloring agent; second, adding the vulcanizing agent and the coloring agent, and then blending the composition. The blended composition used in the method can satisfactorily be any of the compositions set out and described in Tables 1 to 3 above. Next, the composition is molded into a product having a desired shape of steering mechanism or the like, which, for example, may be a steering wheel of well known generally circular configuration, or it may be of other desired shape such as the small steering mechanisms used in wrist-twist steering of recent development. Finally, the molded steering wheel is cured at a temperature within the broad range of about 250° F. to about 400° F., and preferably within the range of about 300° F. to about 370° F.

The properties of the steering wheel in accordance with the invention are such that a hardness (Shore D) is obtained in the broad range of about 55 to about 80, and preferably within the range of about 60 to about 70. In addition, steering wheels prepared in accordance with the invention have successfully passed: (a) an impact test of 800 ft.-lbs. without shattering of the wheel stock, (b) an artificial weathering test of 5 cycles between 190° F. and −20° F. without material cracking, and (c) a hot and cold test of 2 cycles between −40° F. and 175° F. without material cracking. Still further the wheels have been found to have excellent properties of color stability, scuff resistance and abrasion resistance.

In order to further illustrate the invention, the following examples are provided. It is to be understood, however, that the examples are included for illustrative purposes and are not intended to be limiting of the scope of the invention as set forth in the subjoined claims.

Example 1

FOR: TRANSLUCENT BLUE COLORED STEERING WHEEL

| | |
|---|---|
| Solprene-1205 | 90 |
| Polyisoprene | 10 |
| Hi-Sil-233 (hydrated silica high viscosity agent) | 70 |
| Silene-D (hydrated silica low viscosity agent) | 0 |
| Piccotex resin No. 100 | 10 |
| 1,3-butanediol | 7 |
| Peroxide vulcanizing agent (Varox powder) | 4.1 |
| Blue coloring agent | 0.2 |
| (No. 420 blue, available from Cooke Color and Chemical Company, Hackettstown, N.J.). | |

Example 2

FOR: YELLOW COLORED STEERING WHEEL

| | |
|---|---|
| Solprene-1205 | 90 |
| Polyisoprene | 10 |
| Hi-Sil-233 (hydrated silica high viscosity agent) | 60 |
| Silene-D (hydrated silica low viscosity agent) | 90 |
| Piccotex resin No. 100 | 15 |
| Zinc stearate (supplemental processing aid) | 2 |
| 1,3-butanediol | 11.0 |
| Peroxide vulcanizing agent (Varox powder) | 4.1 |
| Yellow coloring agent | 0.2 |
| (No. 405 yellow, available from Cooke Color and Chemical Company, Hackettstown, N.J.). | |

Example 3

FOR: TRANSLUCENT GREEN COLORED STEERING WHEEL

| | |
|---|---|
| Solprene-1205 | 100 |
| Hi-Sil-233 (hydrated silica high viscosity agent) | 110 |
| Silene-D (hydrated silica low viscosity agent) | 0 |
| Piccotex resin No. 100 | 20 |
| 1,3-butanediol | 15 |
| Peroxide vulcanizing agent (Varox powder) | 4.1 |
| Green coloring agent | 0.1 |
| (No. 407 green, available from Cooke Color and Chemical Company, Hackettstown, N.J.). | |

Example 4

FOR: RED COLORED STEERING WHEEL

| | |
|---|---|
| Solprene-1205 | 100 |
| Hi-Sil-233 (hydrated silica high viscosity agent) | 60 |
| Silene-D (hydrated silica low viscosity agent) | 150 |
| Piccotex resin No. 100 | 15 |
| 1,3-butanediol | 15 |
| Peroxide vulcanizing agent (Varox powder) | 4.1 |
| Red coloring agent | 7 |

(No. 410 red, available from Cooke Color and Chemical Company, Hackettstown, N.J.).

Example 5

FOR: BLUE COLORED STEERING WHEEL

| | |
|---|---|
| Solprene-1205 | 100 |
| Hi-Sil-233 (hydrated silica high viscosity agent) | 60 |
| Silene-D (hydrated silica low viscosity agent) | 200 |
| Piccotex resin No. 100 | 20 |
| 1,3-butanediol | 15 |
| Peroxide vulcanizing agent (Varox powder) | 4.1 |
| Blue coloring agent | 10 |

(No. 420 blue, available from Cooke Color and Chemical Company, Hackettstown, N.J.).

Example 6

FOR: BLACK COLORED STEERING WHEEL

| | |
|---|---|
| Solprene-1205 | 100 |
| Hi-Sil-233 (hydrated silica high viscosity agent) | 60 |
| Silene-D (hydrated silica low viscosity agent) | 250 |
| Piccotex resin No. 100 | 25 |
| 1,3-butanediol | 25 |
| Peroxide vulcanizing agent (Varox powder) | 4.1 |
| High intensity carbon black | 2.0 |

(Superba special black, available from Columbia Carbon Company).

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A colored hard rubber steering wheel for steering vehicles and the like which wheel is of generally uniform color throughout its hard rubber composition, said wheel being comprised of means for grasping by hand and capable upon rotation of steering the vehicle, with the hard rubber composition comprising in parts by weight: 100 parts of styrene-butadiene rubber copolymer, about 60 to about 90 parts of a high viscosity hydrated silica pigment, from 60 to about 200 parts of a low viscosity hydrated silica pigment, about 5 to about 60 parts of a processing aid, about 2 to about 30 parts organic plasticizer, about 1 to about 18 parts peroxide vulcanizing agent, and about 0.05 to about 7 parts coloring agent.

2. The steering wheel of claim 1 further characterized as having a surface provided by said composition which surface has a Shore D hardness between about 55 and about 80.

3. A method of preparing a colored hard rubber steering wheel for steering vehicles and the like which wheel is of generally uniform color throughout its hard rubber composition, said wheel being comprised of means for grasping by hand and capable upon rotation or steering the vehicle, with the hard rubber composition comprising in parts by weight: 100 parts of styrene-butadiene rubber block copolymer, about 60 to about 90 parts of a high viscosity hydrated silica pigment for thickening, from 60 to about 200 parts of a low viscosity hydrated silica pigment for thinning and having an ultimate particle size of about 0.08 to about 0.12 microns, about 5 to about 60 parts of a processing aid, about 2 to about 30 parts organic polyhydroxy plasticizer, about 1 to about 18 parts peroxide vulcanizing agent, and about 0.05 to about 7 parts coloring agent, said method comprising the steps of:

(a) mixing together said styrene-butadiene block copolymer, pigment, processing aid, and plasticizer,
(b) adding the peroxide vulcanizing agent and coloring agent, to form a mixture,
(c) blending the mixture,
(d) molding the mixture to form said steering wheel, and then,
(e) curing at a temperature between about 250° F. and about 400° F.

4. The method of claim 3 wherein said curing is at a temperature between about 300° F. and about 370° F.

References Cited

UNITED STATES PATENTS

| | | | |
|---|---|---|---|
| 2,976,573 | 3/1961 | Davis | 74—552 |
| 3,014,883 | 12/1961 | Wolf | 260—41.5 |
| 3,141,004 | 7/1964 | Wolf | 260—41.5 |
| 2,956,978 | 10/1960 | Reeves | 260—31.4 |
| 3,055,297 | 9/1962 | Leeds | 260—33.4 |
| 2,764,572 | 9/1956 | Pechus. | |
| 3,317,446 | 5/1967 | Wilder. | |
| 2,845,411 | 7/1958 | Willis. | |
| 2,636,867 | 3/1953 | Humfeld. | |
| 2,897,173 | 7/1959 | Boggs. | |

OTHER REFERENCES

Rubber World, Materials and Compounding Ingredients for Rubber and Plastics, 1965, pp. 132, 274, 446, 466.

Allen, India Rubber World, August 1949, pp. 577–581 and 586.

Rubber Age, June 1955, pp. 399–404.

MORRIS LIEBMAN, *Primary Examiner.*

H. H. FLETCHER, *Assistant Examiner.*

U.S. Cl. X.R.

74—552; 260—33.4, 41.5